(12) United States Patent
Foley (10) Patent No.: US 9,130,984 B2
(45) Date of Patent: Sep. 8, 2015

(54) NETWORK EAVESDROPPING DETECTION (71) Applicant: Cisco Technology, Inc., San Jose, CA (US)

(72) Inventor: John Foley, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 13/896,550

(22) Filed: May 17, 2013

(65) Prior Publication Data

US 2014/0344930 A1 Nov. 20, 2014

(51) Int. Cl.
*G06F 11/00* (2006.01)
*H04L 29/06* (2006.01)

(52) U.S. Cl.
CPC ........ *H04L 63/1425* (2013.01); *H04L 63/1475* (2013.01)

(58) Field of Classification Search
CPC ............ H04L 63/1416; H04L 63/1408; H04L 63/1441; H04L 63/1458; H04L 63/1425; G06F 21/552
USPC .......................................... 726/23, 22, 24, 25
See application file for complete search history.

(56) References Cited

U.S. PATENT DOCUMENTS

| | | | |
|---|---|---|---|
| 6,541,878 B1 | 4/2003 | Diab | |
| 7,061,142 B1 | 6/2006 | Marshall | |
| 7,657,938 B2 | 2/2010 | Palmer, Jr. et al. | |
| 8,018,349 B1 | 9/2011 | Getker et al. | |
| 8,300,666 B2 | 10/2012 | Karam et al. | |
| 8,305,906 B2 | 11/2012 | Karam | |
| 2003/0110396 A1* | 6/2003 | Lewis et al. | 713/201 |
| 2005/0257262 A1 | 11/2005 | Matityahu et al. | |
| 2013/0044003 A1* | 2/2013 | Eguro et al. | 340/653 |

OTHER PUBLICATIONS

Larry Wakeman, AN-757 Measuring Ethernet Tap Capacitance, Mar. 1991, Texas Instruments.

* cited by examiner

*Primary Examiner* — Baotran N To
(74) *Attorney, Agent, or Firm* — Lempia Summerfield Katz LLC (57) ABSTRACT In one implementation, network taps are detected using impedance measurements from a network. A network device is configured to calculate a baseline impedance as a function of a sequence of impedance values. As impedance measurements subsequent to the sequence of impedance values are received, the network device is configured to calculate a difference between the impedance measurement and the baseline impedance. The network device generates a network tap warning message when the difference between the impedance measurement and the baseline impedance exceeds a threshold. The network device may be an endpoint computer, a data switch, or an external device remote from the network.

19 Claims, 5 Drawing Sheets

NETWORK EAVESDROPPING DETECTION

TECHNICAL FIELD

This disclosure relates in general to the field of network eavesdropping detection, or more particularly, to network eavesdropping detection based on impedance monitoring.

BACKGROUND

Various terms such as "sniffers," "probes," and "snoops" describe hardware components or software components capable of intercepting or otherwise examining network data traffic such that a copy of the data is made without altering or redirecting the network traffic. Network probes may be used for malicious applications that eavesdrop on or copy data such as communications, credit card numbers, financial records, social security numbers, user credentials, passwords, or other confidential data. Network probes may be used for security applications such as detection of a malicious application.

Physical probes may be directly connected to a network. The physical probes may be difficult to detect on the network because the physical probes may be passive device, have no physical or logical address and do not respond to end network communications.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a method includes receiving a series of impedance values for a communication line over a time period and calculating a baseline impedance as a function of the series of impedance values. After the time period, an impedance measurement is generated, and a difference between the impedance measurement and the baseline impedance is calculated. The difference is compared to a threshold impedance tolerance, and a warning message is generated when the absolute value of the difference exceeds the threshold impedance tolerance.

In another embodiment, a computer readable medium includes instructions that when executed by a processor are operable to receive an impedance measurement, detect a network tap as a function of the impedance measurement, generate a network tap warning message in response to the detection of the network tap, and send the network tap warning message to a cloud service.

Example Embodiments

A network tap is a physical probe. The network tap is any hardware device configured to obtain unintended access of data across a computer network. The computer network may be a cable connecting two nodes or a more complex network. The network tap connects to the computer network at any point between the two nodes. The network tap may monitor, record, or log the data and/or data packet headers of data transferred between the two nodes. The network tap may physically connect to the cable through an inductive connection (e.g., a network tap configured to clip onto the cable) or a direct connection (e.g., a network tap configured to electrically splice onto the cable).

The network tap may be inserted along a transmission line. The network tap may include at least three connections. The tap is inserted along the transmission line between an A side connection and a B side connection. The third connection monitors an output based on the traffic of the transmission line. The output may include all or some of the data traffic transmitted along the transmission line. The output may include the headers of the data traffic, or the output may include statistics of the data traffic. Example statistics include a volume of the traffic, a latency of the traffic, and/or a jitter of the traffic.

When the network tap is inserted into the transmission line, the impedance of the transmission line may be altered. The impedance is the complex ratio of voltage to current in an alternating current (AC) circuit. The impedance includes a magnitude and a phase. The magnitude is the ratio of the AC voltage amplitude to the AC current amplitude. The phase is the number of degrees or radians that the current is ahead of the voltage in time. A network device coupled with the transmission line is configured to monitor the impedance of the transmission line. When the impedance of the transmission line changes in an unexpected way, the network device detects the presence of the network tap. Alternatively, the network device relays impedance information to an external threat defense system, which detects the presence of the network tap. The external threat defense system may be a cloud service such as a security as a service. When a network tap is detected, a warning message may be generated for the user of the network device or the network device may be disabled. In one example, only an affected port of the network device is disabled.

Figure 1:
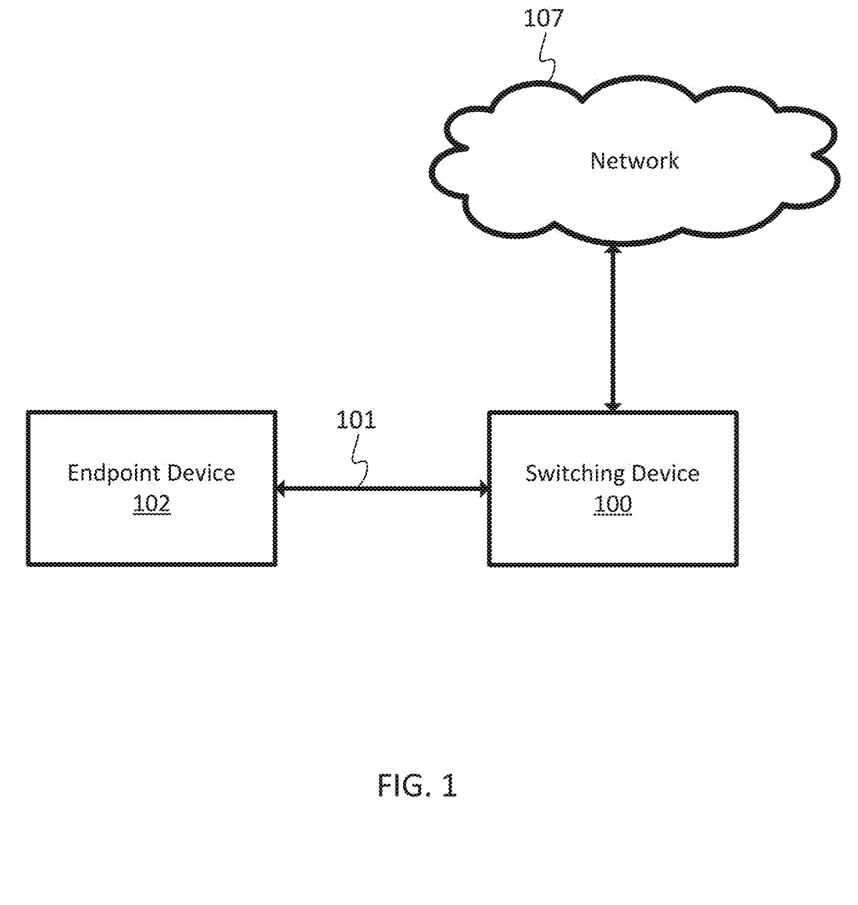
FIG. 1 illustrates an example system for the network eavesdropping detection.

FIG. 1 illustrates an example system for network eavesdropping detection. The system includes a switching device 100 and an endpoint device 102 connected by communication line 101. The switching device 100 and the endpoint device 102 may be coupled with other devices via the network 107. The phrase "coupled with" includes directly connected to or indirectly connected through one or more intermediate components. Such intermediate components may include hardware and/or software-based components. Additional, different, or fewer components may be provided, such as multiple switching devices and/or multiple endpoint devices coupled with each switching device.

The endpoint device 102 may be a workstation, a personal computer, a laptop, or any device configured to communicate over a wired connection to the switching device 100. The endpoint device 102 may be a wireless access point. The switching device 100 may be a data switch, a router, a hub, or any device configured to forward or route data packets. A communication line 101 connects the endpoint device 102 to the switching device 100. In other embodiments, the communication line 101 connects the switching device 100 to another switching or other internal network device rather than an endpoint device 102.

The communication line 101 may be formed of a conductive material (e.g., copper) or an optical material (e.g., fiber optic cable). The communication line 101 may be an Ethernet cable. The communication line 101 may include one or more twisted pairs of wires. Each twisted pair may be duplex or half-duplex. The communication line 101 may be a trunk transmission carrier (e.g., T1 line).

Figure 2:
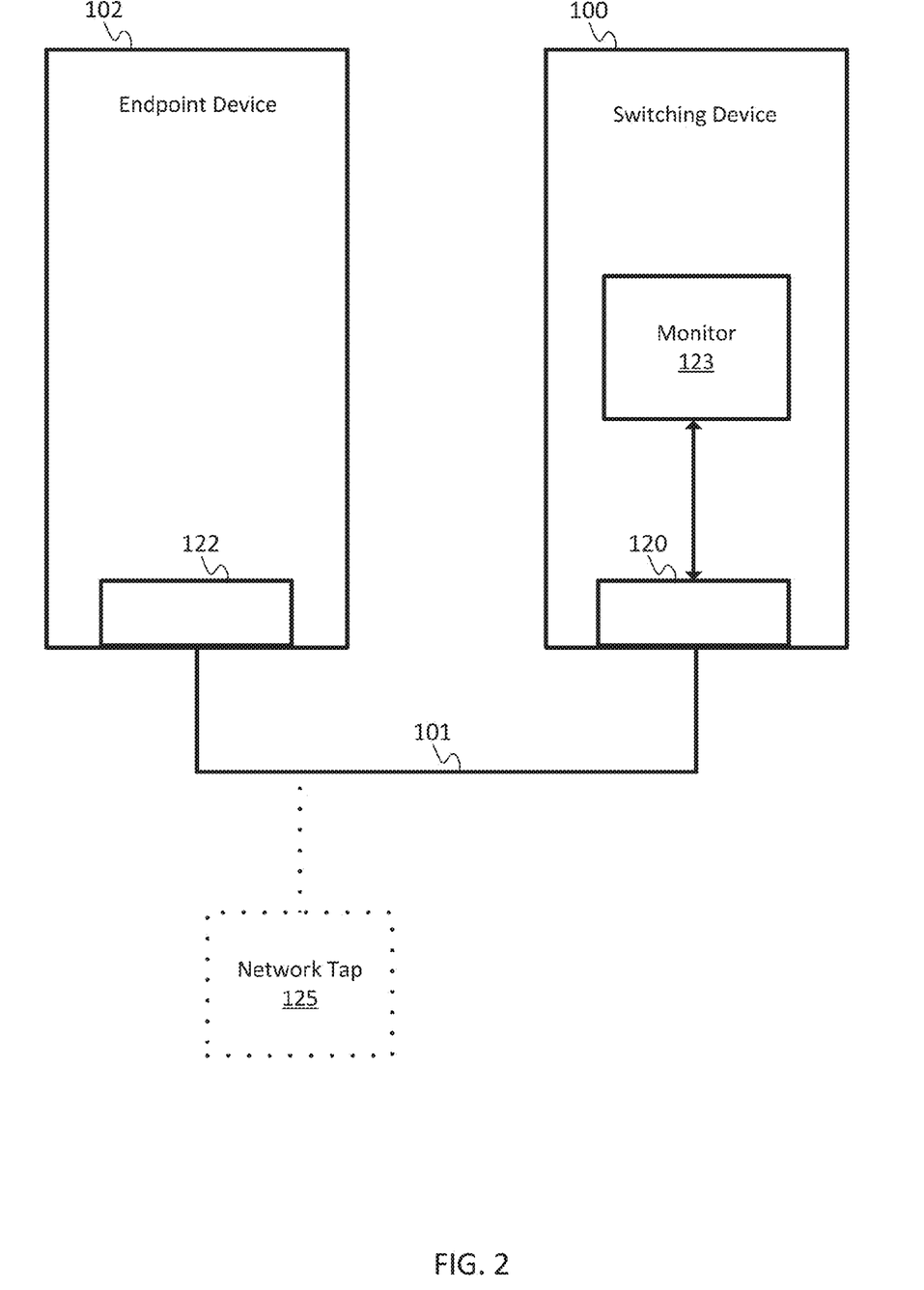
FIG. 2 illustrates an example network tap in the system of FIG. 1.

FIG. 2 illustrates an example network tap 125 in the system of FIG. 1. The network tap 125 is coupled to the communication line 101 and configured to eavesdrop on communications between the switching device 100 and the endpoint device 102. The network tap 125 may connect at any point along the communication line 101, including at the port with the switching device 100 or the endpoint device 102. The network tap 125 may be designed to tap into the communication flow without interfering with the traffic that is passing through the communication line 101. However, the network tap 125 cannot be completely invisible to the network. The network tap 125 may cause a voltage drop and/or delay in the signals carrying the communication flow, which may be detected by measuring the impedance of the communication line 101.

The impedance may be measured by a transceiver 120 of the switching device 100. The transceiver 120 and the communication line 101 may be connected in the physical layer (PHY) of the OSI model. The transceiver 120 may be configured to measure the impedance of the communication line 101 using time-domain reflectometry. For example, the transceiver 120 may generate one or more test pulses that are sent to the communication line 101. The transceiver 120 is configured to detect return pulses that result from the one or more test pulses reflecting off of the network tap 125. In another embodiment, a transceiver 122 of the endpoint device 102 sends one or more test pulses to the transceiver 120. The transceiver detects the presence of the network tap 125 depending impedance values, which may depend on the received levels of the test pulses. The test pulses may be at different frequencies of a sweeping signal. Accordingly, the series of impedance values may be calculated at different frequencies of a test signal or impulse signal.

An absolute value or a change in value indicates the network tap 125. For example, the transceiver 120 is configured to perform a calculation of at least one of the series of impedance values for the communication line from the return signal. The calculation may be a comparison of the return signal to the impulse signal. The impedance value may be a function of the ratio of the impulse signal to the return signal and a constant value. The constant value may depend on the physical characteristics of the communication line 101 or may be a previous, steady state measure. Example constants include 50 ohms, 500 ohms, and 1000 ohms.

In another implementation, the transceiver 120 may be configured to measure the impedance of the communication line 101 by analyzing the communication signals carrying data traffic. For example, the transceiver 120 may detect a drop in voltage levels of the communication signals carrying data traffic caused by the network tap 125 coupled to the communication line 101. Any impedance measurement and corresponding device may be used.

The monitor 123 is a controller or program that interacts with the transceiver 120 to analyze the detected impedance values. The monitor 123 may be a separate component or integrated into the transceiver 120. The monitor 123 is configured to receive one or a series of impedance values for the communication line 101 over a time period. The time period may be a predetermined time period configured by an administrator. Example time periods include 1 hour, 1 day, or 1 week. The time period may be continuous. That is, the time period may begin when the switching device 100 is powered on and extend indefinitely as impedance measurement are taken. In another implementation, the monitor 123 is configured to calculate the time period as a function of a number of the series of impedance values. That is, the time period is defined as a predetermined number of samples for the impedance value. Example quantities of impedance value that constitute a sufficient time period may be 10, 100, or 1000 samples.

The monitor 123 is configured to calculate a baseline impedance as a function of the series of impedance values. The baseline impedance may be an average of the series of impedance values. The baseline impedance may be an average of the series of impedance values over a recent time period (e.g., over the last 24 hours). The baseline impedance may vary based on time of day or usage of the communication line 101. The baseline impedance may change over time. For example, the function for calculating the baseline impedance may include a sliding average of the series of impedance values. For example, a set of the most recent samples may be averaged. The set may include the most recent 10, 100, 200, or another number of recent samples. Alternatively, an expected or predetermined baseline is used.

Once the baseline impedance has been established, the monitor 123 compares subsequent impedance measurements to the baseline. For example, the monitor 123 may calculate a difference between the subsequent impedance measurement and the baseline impedance. Alternatively, any impedance measurements are compared to a threshold.

The monitor 123 is configured to compare an absolute value of the difference to a threshold impedance tolerance. Example threshold impedance tolerances may be 5 ohms, 10 ohms, 50 ohms, 100 ohms, or another value. Example threshold impedance tolerance may be a percentage of the baseline (e.g., 10%, 25%, 50%, or another value). The threshold impedance tolerance may be selected by a user. The user may configure the threshold impedance tolerance to select a tradeoff between a lower tolerance level, which may include more false positive warnings but has a higher reliability of detection of network taps and a higher tolerance level, which may include fewer false positive warnings but has a lower reliability of detection of network taps.

When the monitor 123 determines that one or other number of the subsequent impedance measurements deviates too much from the baseline, the monitor 123 generates a warning message. The warning message may be stored as a register value in the transceiver 120. The register value may be a single bit that indicates whether or not the impedance measurements have deviated too much from the baseline.

The warning message may be sent to an administrator associated with the switching device 100. The warning message may include text that indicates that a possible eavesdropping device is suspected on the network 107. The warning message may indicate that the switching device 100 and/or port is being shut down, and the transceiver may temporarily stop sending data to and/or receiving data from the communications line 101. The warning message may be sent to a cloud security service. The warning message may be transmitted using simple network management protocol (SNMP), syslog, extensible markup language (XML), hypertext transfer protocol (HTTP), short message service (SMS) text message, email, or another format.

The transceiver 122 of the endpoint device 102 may perform any of the functions described with respect to the transceiver 120 of the switching device 100. The impedance may be measured from the perspective of either the endpoint device 102 or the switching device 100 (i.e., the endpoint device 102 may also include a monitoring device or program). In addition, both the endpoint device 102 and the switching device 100 may measure impedance of the communication line 101. The endpoint device 102 may generate data indicative of the impedance of the communication line 101 and transmit the data to the switching device 100 or vice versa. The results from the two impedance measurements may be compared so that outliers or false positives may be ignored. Similarly, the monitor 123 is in the endpoint device 102 or separate monitors 123 are in both the endpoint device 102 and the switching device 100.

Figure 3:
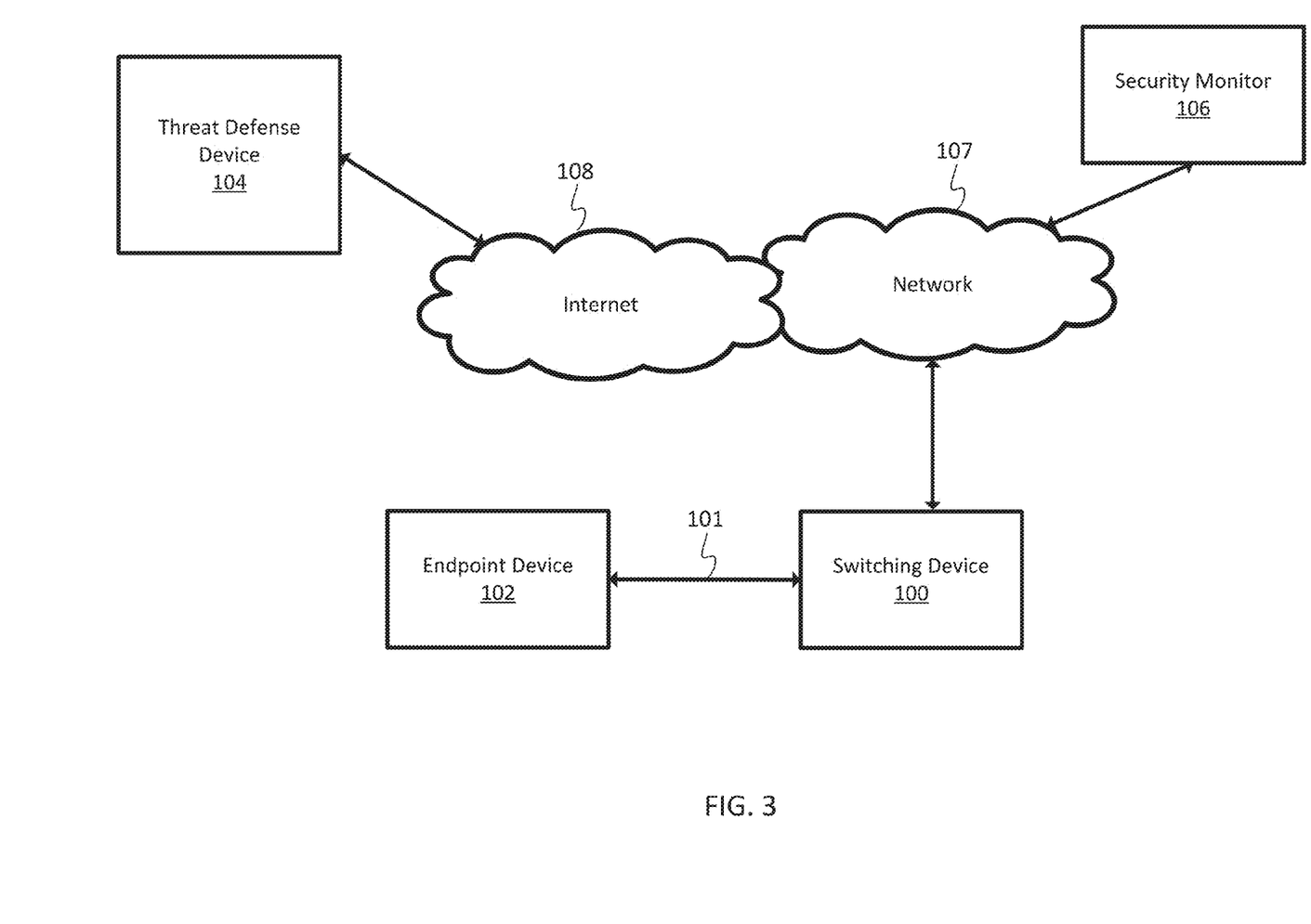
FIG. 3 illustrates another example system for network eavesdropping detection.

FIG. 3 illustrates another example system for network eavesdropping detection. The network 107 may include a security monitor 106 external to the switching device 100. The security monitor 106 may be a computer or software program on a server for calculating the impedance baseline, comparing measurements, or detecting a network tap 125. The system for network eavesdropping detection may also include a threat defense device 104 by way of the Internet 108 or other network. In one example, the security monitor 106 calculates baseline impedance levels and performs impedance comparisons on a local area network (LAN) level and the threat defense device 104 calculates baseline impedance levels and performs impedance comparisons on an enterprise level across multiple LANs.

The security monitor 106 or the threat defense device 104 may receive impedance values from multiple switching devices 100 and/or multiple network devices 101. Alternatively or in addition, a series of impedance values may be received from multiple ports of a single device. The baseline may be established for each port, and the warning message and/or command that disables traffic flow may be port specific.

The security monitor 106 or the threat defense device 104 may be configured to calculate a variance of a series of impedance values for the communication line 101 as the series of impedance values are received. The time period for determining the baseline may be defined according to the variance values. For example, a shorter time period may be used when the variance is low, and a longer time period may be used with the variance is high.

The security monitor 106 or the threat defense device 104 may analyze the impedance values in aggregate. For example, the impedances for multiple ports or multiple devices are added to together to establish the baseline. Subsequent impedance measurements are also aggregated before comparison to the aggregate baseline. Alternatively or additionally, multiple measures from the same communication line 101 are averaged and the average is compared to the baseline.

The security monitor 106 or the threat defense device 104 may be configured to access the register in the transceiver 120 that indicates whether recent impedance measurements have deviated too far from the baseline. The register may include a single bit or additional information. Alternatively, the single bit and/or other information may be added to all data traffic passing through the transceiver 120.

In one example, the transceiver 120 or the security monitor 106 records a log of warning messages. The log may be reported to the threat defense system 104 periodically. The logs may include the baselines used for the impedance comparison and/or the impedance values. The log may also include the date and time of the potential eavesdropping. The log may include potential eavesdropping events from multiple devices. The log may include an identification value for the communication line. The identification value may identify a port of the endpoint device 102 or the switching device 100. The warning messages may be stored, and the administrator of the network notified only after a predetermined number of warning messages have been generated.

Figure 4:
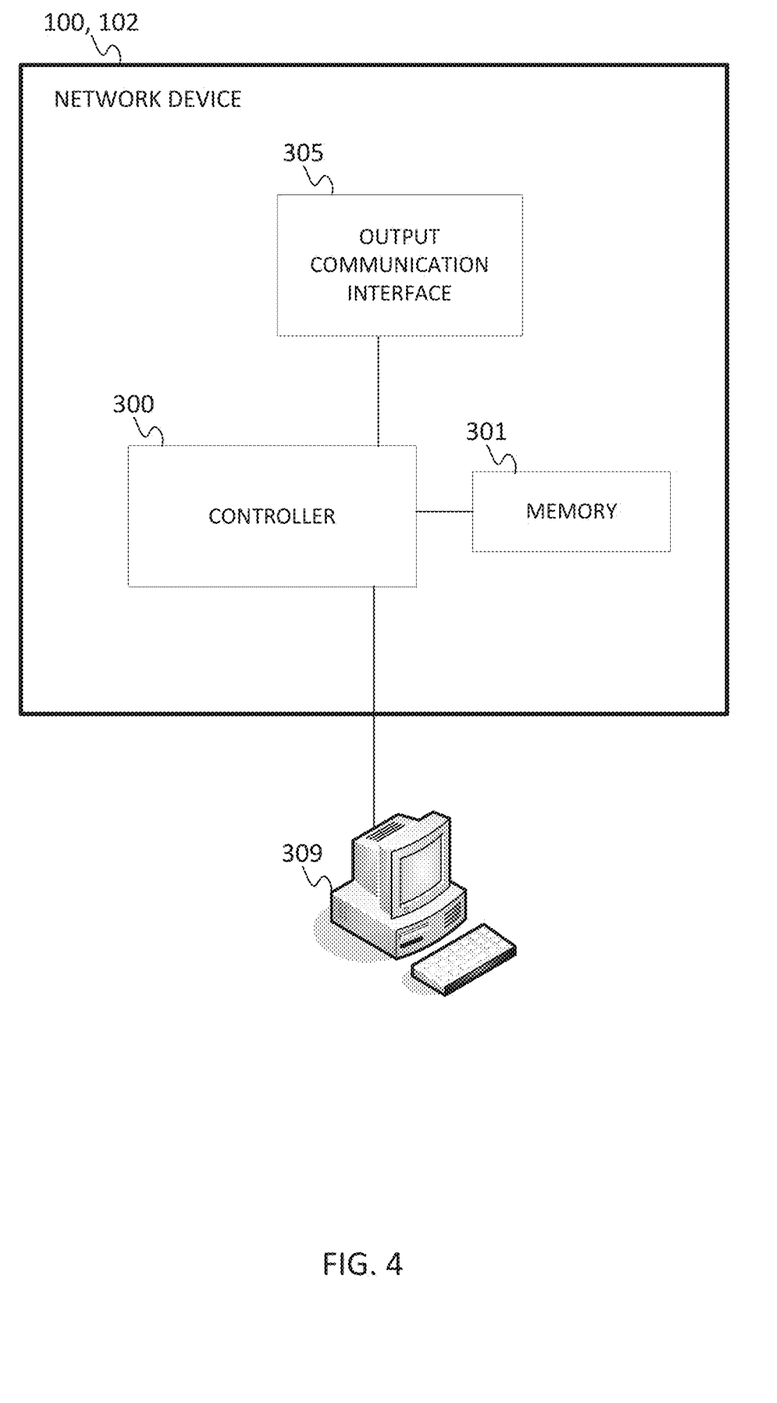
FIG. 4 illustrates an example network device of the systems of FIGS. 1 and 2.

FIG. 4 illustrates an example network device for the networks of FIGS. 1-3. The network device may be the endpoint device 102 or the switching device 100. The network device includes at least a memory 301, a controller 300, and a communication interface 305. Additional, different, or fewer components may be provided. Different network devices may have the same or different arrangement of components.

Figure 5:
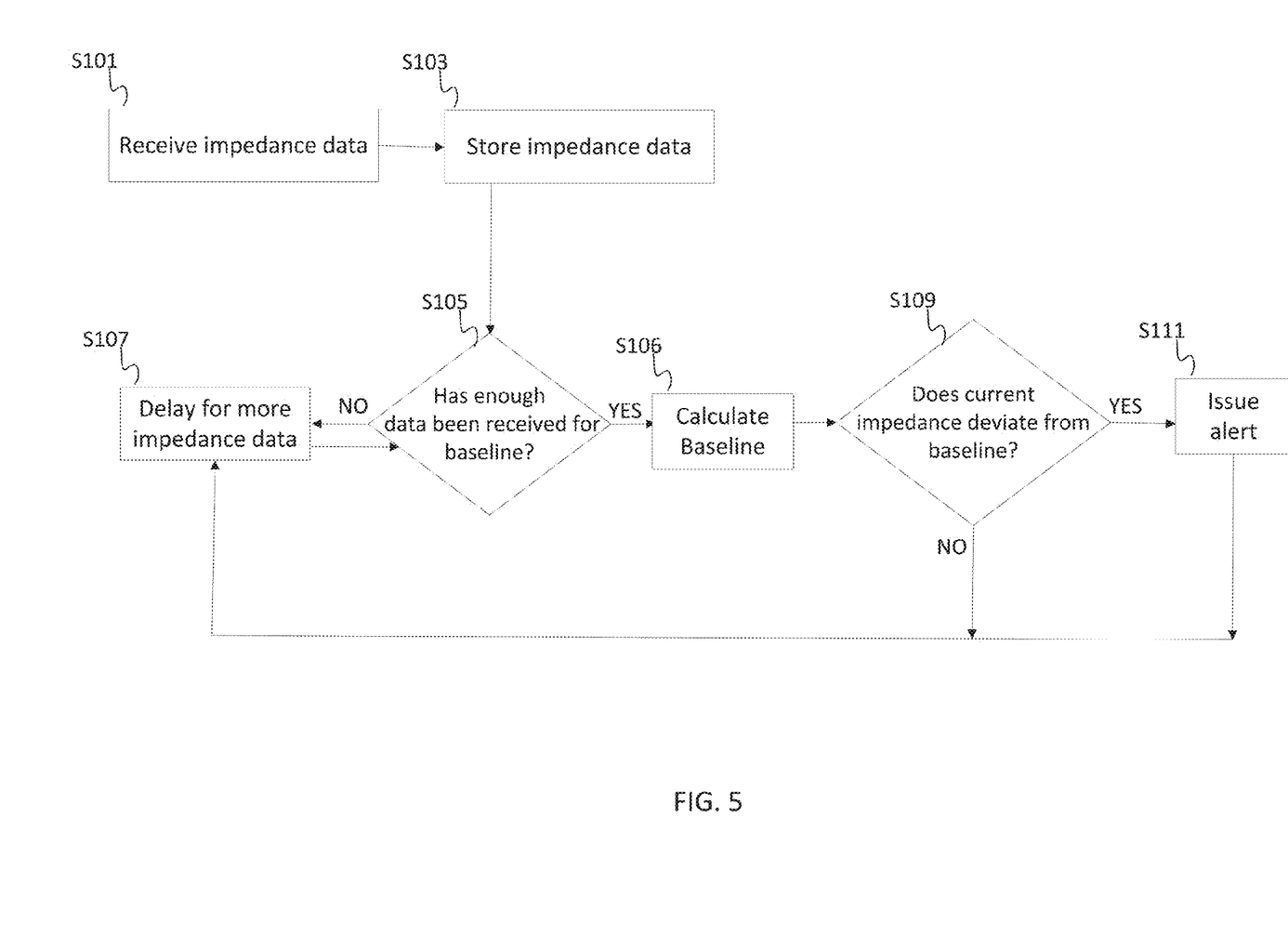
FIG. 5 illustrates an example flowchart for network eavesdropping detection.

FIG. 5 illustrates another example flowchart for network eavesdropping detection. The acts in FIG. 5 may be performed by the endpoint device 102, the security monitor 106, the threat defense device 104 or the switching device 100. For example, the threat defense device 104 may be cloud service provider. The cloud service provider may receive the impedance values directly and calculate the baseline or receive the warning message. Additional, different, or fewer acts may be provided. The acts are performed in the order shown or other orders. The acts may also be repeated.

At act S101, the communication interface 305 receives a series of impedance values for a communication line over a time period. The impedance values may be collected from signals of different frequencies or a single frequency. For example, a sweeping impulse signal may be sent through the communication line and multiple current and voltage measurements are taken based on reflections of the impulse signal. The impedance values may be the ratios of voltage to current at the same frequency of the sweeping impulse signal. Alternatively, the impedance may be taken at the same frequency (e.g., the carrier frequency of the communication signals).

At act S103, the memory 301 persists or stores impedance data for the communication line. A first set of data may be collected over a specific initial time period (e.g., 1 minute, 1 hour or another initial time period). Subsequently, the controller 300, at act S105, determines whether enough data has been received to calculate a baseline. The data sufficient for a baseline may be defined according to one or more of the amount of data, the type of data, or a time period. The amount of data may be a number of impedance values. The type of data may be a statistical analysis of the data. For example, the number of impedance values may be a function of the variation within the impedance values. The baseline may be a range of permissible impedance values.

Alternatively, the time period may be configured by an administrator to set the baseline regardless of the quantity of impedance value calculated. For example, the network device includes a timer that measures time from boot up or from the first impedance value. The process loops between acts S107 and S105 until the timer reaches the time period. When the time period has elapsed or sufficient data for the impedance value has otherwise been collected, the process proceeds to act S109.

At act S106, the controller 300 is configured to calculate a baseline impedance as a function of the series of impedance values. The baseline may be an average of the impedance values. The baseline may be an average of the magnitude of the impedance values. In one example, the baseline may include values for various phase angles.

In another example, the baseline may be a function of the amount of data traffic received. For example, multiple baseline values are calculated depending on how much data traffic is being carried by the communication line. In another example, the baseline may be a function of the time of day or day of the week. In yet another example, the baseline is a set or predetermined value not based on measurements for a specific communications line.

At act S109, the controller 300 determines whether a current impedance measurement or measurements deviate from the baseline. The controller 300 calculates a difference between the current impedance measurement and the baseline impedance. At act S111, the controller generates an alert when the absolute value of the difference between the current impedance measurement and the baseline impedance exceeds a threshold impedance tolerance. The alert may be an email message or other message sent to an administrator of the network. The alert may include a command to disable temporarily or permanently the communication line or a specific port of the network device. The memory 301 is configured to record the alert, an identifier for the communication line, and a time stamp.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface 305 may include any operable connection. An operable connection may be one in which signals, physical communications, and/or logical communications may be sent and/or received. An operable connection may include a physical interface, an electrical interface, and/or a data interface. The communication interface 305 may include separate input and output communication interfaces or may be combined into a single full-duplex communication device that performs both input and output.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memory 301 is an example of computer readable media or non-transitory computer readable media. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   sending a series of impulse signals over a communication line for a time period;
   receiving a series of impedance values for the communication line over the time period in response to the series of impulse signals;
   calculating a baseline impedance as a function of the series of impedance values;
   receiving an impedance measurement generated after the time period;
   calculating a difference between the impedance measurement and the baseline impedance;
   comparing the difference to a threshold impedance tolerance; and
   generate a warning message when the absolute value of the difference exceeds the threshold impedance tolerance.

2. The method of claim 1, further comprising:
   receiving a return signal in response to the impulse signal; and
   performing a calculation of at least one of the series of impedance values for the communication line from the return signal.

3. The method of claim 2, wherein the calculation includes a comparison of the return signal to the impulse signal.

4. The method of claim 2, further comprising:
   sending the impulse signal to the communication line, wherein the return signal results from the impulse signal.

5. The method of claim 2, wherein the series of impedance values are calculated at different frequencies of the impulse signal.

6. The method of claim 1, further comprising:
   calculating a variance of the series of impedance values for the communication line as the series of impedance values are received; and
   calculating the time period as a function of the variance.

7. The method of claim 1, further comprising:
   calculating the time period as a function of a number of the series of impedance values.

8. The method of claim 1, wherein the function for calculating the baseline impedance includes a sliding average of the series of impedance values.

9. The method of claim 1, further comprising:
   recording the warning message in a log; and
   sending the log to a central threat defense system or a cloud service.

10. The method of claim 1, wherein the warning message includes a command to disable a port of a network device.

11. An apparatus comprising:
    a communication interface configured to receive a series of impedance values for a communication line over a time period; and
    a controller configured to calculate a baseline impedance as a function of the series of impedance values and a difference between a current impedance measurement and the baseline impedance,
    wherein an alert is generated when the difference between the current impedance measurement and the baseline impedance exceeds a threshold impedance tolerance, wherein the alert indicates that a network tap may be coupled with the communication interface
    wherein the controller is configured to generate an impulse signal for the communication line and the series of impedance values are derived from a reflection of the impulse signal.

12. The apparatus of claim 11, wherein the series of impedance values are based on a ratio of the reflection of the impulse signal to the impulse signal.

13. The apparatus of claim 11, wherein the controller is configured to calculate the time period as a function of a variance of the series of impedance values.

14. The apparatus of claim 11, wherein the controller records the alert, an identifier for the communication line, and a time stamp in memory.

15. The apparatus of claim 14, wherein the identifier for the communication line identifies a port.

16. A non-transitory computer readable medium including instructions that when executed by a processor are operable to:
    send an impulse signal;
    receive a return signal including an impedance measurement;
    detect a network tap as a function of the impedance measurement;
    generate a network tap warning message in response to the detection of the network tap; and
    send the network tap warning message to a cloud service.

17. The non-transitory computer readable medium of claim 16, wherein the network tap warning message specifies a port of a network device.

18. The non-transitory computer readable medium of claim 16, wherein the sequence of impedance values includes a plurality of impedance values from each of multiple ports of a network device and the baseline includes a baseline value for each of the multiple ports of the network device.

19. The non-transitory computer readable medium of claim 16, wherein the impulse signal is a sweeping signal having multiple frequencies and the detection of the network tap is based on the impedance measurement from the sweeping signal.

* * * * *